United States Patent [19]

Currier et al.

[11] Patent Number: 4,811,575
[45] Date of Patent: Mar. 14, 1989

[54] SOUND INSULATED BELLOWS-TYPE AIR TERMINAL VALVE

[75] Inventors: Frederick A. Currier, Syracuse; Carl C. Herb, Camillus, both of N.Y.

[73] Assignee: Carrier Corporation, Syracuse, N.Y.

[21] Appl. No.: 107,608

[22] Filed: Oct. 13, 1987

Related U.S. Application Data

[63] Continuation-in-part of Ser. No. 562,547, Dec. 19, 1983.

[51] Int. Cl.⁴ .............................................. F24F 13/08
[52] U.S. Cl. ................................ 98/41.1; 98/DIG. 10; 92/92; 251/61.1
[58] Field of Search ............... 98/40.14, 40.15, 40.16, 98/40.17, 41.1, DIG. 10; 251/61.1; 92/34, 47, 103 R, 89–91; 417/413

[56] References Cited

U.S. PATENT DOCUMENTS

| | | | |
|---|---|---|---|
| 3,120,192 | 2/1964 | Winchell | 92/34 X |
| 3,168,907 | 2/1965 | Mercier et al. | 92/98 R X |
| 3,198,228 | 8/1965 | Naito | 383/65 |
| 3,412,669 | 11/1968 | Averill | 98/40.17 |
| 3,495,502 | 2/1970 | Bousso | 92/34 X |
| 3,554,111 | 1/1971 | Traver | 98/40.16 |
| 3,881,686 | 5/1975 | Hirmann | 251/61.1 |
| 4,019,566 | 4/1977 | Cobb | 98/40.16 X |
| 4,077,310 | 3/1978 | McCabe et al. | 98/40.16 |
| 4,399,739 | 8/1983 | Dean | 98/41.1 |
| 4,442,760 | 4/1984 | Dean et al. | 98/40.16 X |
| 4,624,442 | 11/1986 | Duffy et al. | 251/61.1 |

FOREIGN PATENT DOCUMENTS 1585974  3/1981  United Kingdom .

Primary Examiner—Robert E. Garrett
Assistant Examiner—George Kapsalas
Attorney, Agent, or Firm—David J. Zobkiw

[57] ABSTRACT

A bellows assembly is secured to a retainer by extrusions having a mushroom or arrow shaped cross section. Air flowing through the terminal impinges upon an impervious film covering the central portion of the device and is diverted into two flow paths. Initially the flow paths extend between the film and the cutoff plates which coact to form a tight shut off. Downstream of the cutoff plates, the flow paths are between a porous foam covering the bellows and foam surrounding the cutoff plates to provide a sound reducing effect. If necessary or desirable, the back of the retainer may be covered with foam or other suitable sound insulating material.

4 Claims, 2 Drawing Sheets

SOUND INSULATED BELLOWS-TYPE AIR TERMINAL VALVE

The present invention is a continuation-in-part of application No. 562,547 filed Dec. 19, 1983.

BACKGROUND OF THE INVENTION

In parent application No. 562,547, which is hereby incorporated by reference, a bellows assembly is described which is made up of a bellows and a retainer which coact to form a pair of uniformly spaced seals running the full length of the bellows. The bellows itself is made up of a sheet of film with two extrusions suitably secured thereto at a uniformly spaced distance to form an integral unit. Accordion pleat members located at the two ends complete the seal. The two extrusions run the length of the film and, in cross-section, are of an arrowhead or mushroom configuration and deform to permit attachment of the film member to the retainer. The bellows or bladder coacts with a cut off plate to form a damper. The air flow was over the full width bellows for its entire length and there was no directional change in flowing over the bellows other than that incidental to the flow regulating valving action due to bellows inflation/deflation.

The above described damper provides a uniformity of devices such that it was no longer necessary to calibrate every terminal. This design has flow volume limitation due to the relatively limited width of the single flow path at the full open position. By locating the bellows transversely to the flow, two controlled flow paths or outlets are formed. This modification requires the air to impinge upon the bellows with the air being diverted into two flow paths. The result is a noisier unit. Placing porous foam on the surface impinged upon by the air flow has a sound reducing effect but the foam provides a leakage path which makes shutting the damper essentially impossible when using duct pressure to inflate the bellows since the same pressure is on both sides of the bellows. Also, the amount of leakage varies with the degree of compression of the foam subsequent to the foam contacting the cutoff plates.

SUMMARY OF THE INVENTION

The bellows is made in the form of a bag or bladder with two extrusions running the length of the bag to provide a uniformity of response that eliminates the need for calibration pursuant to the teachings of the parent application. The bag or bladder is located directly in the path of the air which is diverted to either side which nominally doubles the outlet area as compared to the parent application. The surface of the bag or bladder impinged upon by the air is covered with foam to provide a noise reducing effect. However, the foam is, in turn, covered by an impervious film over the portion of the foam between the two cutoffs. As a result, the air flow does not contact the foam upstream of the cutoffs so that an essentially complete shut off, within 1-5% of nominal flow, is achieved. The foam on the bellows is exposed to the air flow downstream of the cutoffs and additional foam or other porous material outside the edges of the cutoffs so that the flow goes between two porous members downstream of the cutoffs.

It is an object of this invention to provide an air terminal in which the bellows does not require calibration. It is another object of this invention to provide an air terminal having increased air flow capacity, essentially complete shut off, an acceptable sound level and a reduced minimum pressure requirement. These objects, and others as will become apparent hereinafter, are accomplished by the present invention.

Basically, in an air terminal made up of a plenum, a bellows assembly and a diffuser, air flows from the plenum to the diffuser under the control of the bellows. In passing from the plenum, the air impinges upon the bellows assembly and is divided such that both flows are deflected nominally 90°. The air impinging upon the bellows assembly hits an impervious film which overlies a porous foam member which is, in turn, secured to the bellows. The impervious film extends between the two cutoffs so as to provide an essentially complete shut off. However, the air passing beyond the cutoffs passes between the exposed foam on the bellows and foam or other porous material outside the edges of the cutoffs to provide sound reduction. The air paths are then directed to the diffuser which discharges the air into the room or zone.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
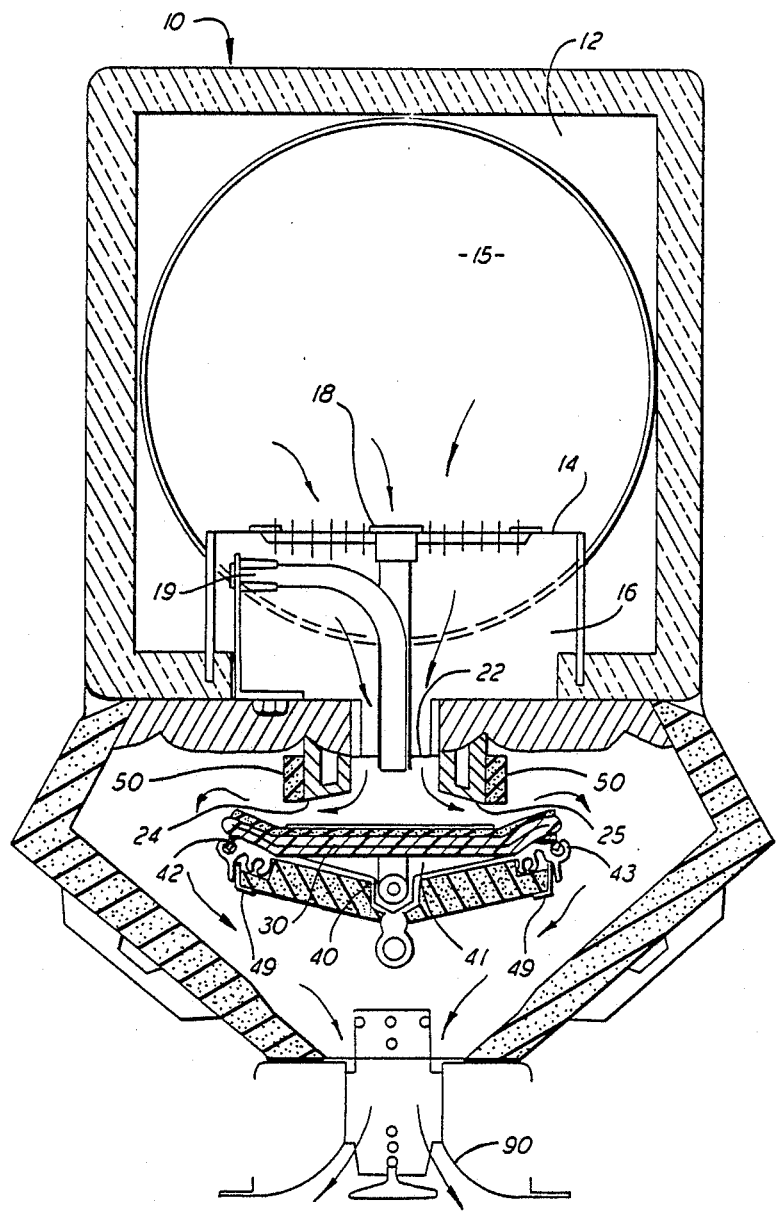
FIG. 1 is a sectional view of an air terminal incorporating the present invention.

In FIG. 1, the numeral 10 generally designates an air terminal. Nozzle plate 14 divides plenum 12 into high and low pressure areas 15 and 16, respectively. High pressure pickup 18 extends through the nozzle plate 14 into high pressure area 15 and provides a high pressure input to a flow control device (not illustrated). Low pressure pickup 19 is located within low pressure area 16 and provides a low pressure signal to the flow control device. In the open position illustrated in FIG. 1, the air flows from high pressure area 15 through nozzle plate 14 into low pressure area 16. The air then passes through slot 22 and impinges upon the bellows assembly 30 and is diverted 90° into two flows which pass between the bellows assembly 30 and the cutoff plates 24 and 25. The flow is then directed to the diffuser 90 and discharged into the room or zone. It will be noted that the movable portion of bellows assembly 30 is in a concave configuration in the open position.

Figure 3:
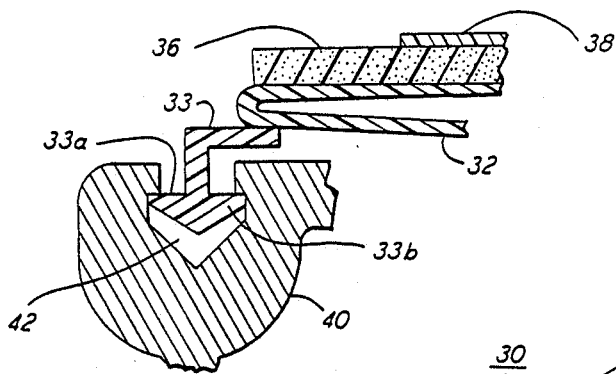
FIG. 3 is an enlarged partial sectional view of the attachment structure of the bellows.
Figure 4:
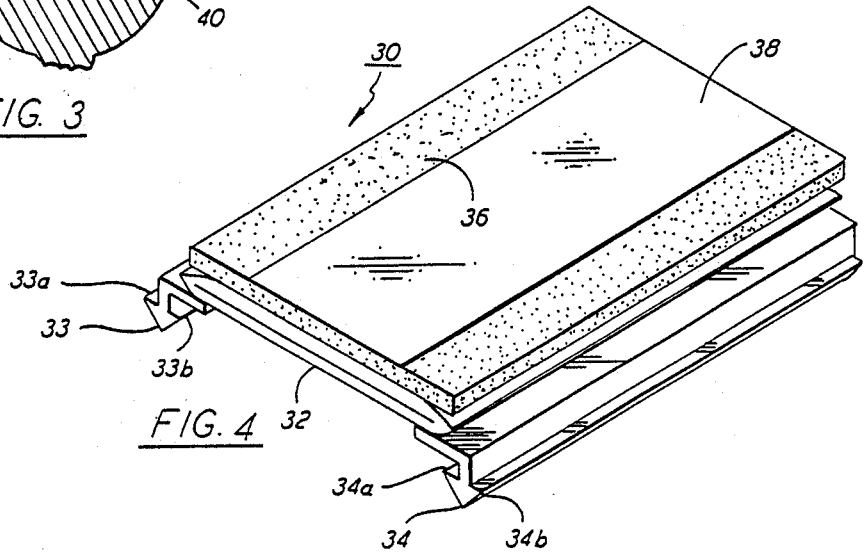
FIG. 4 is a pictorial representation of the bellows.
Figure 2:
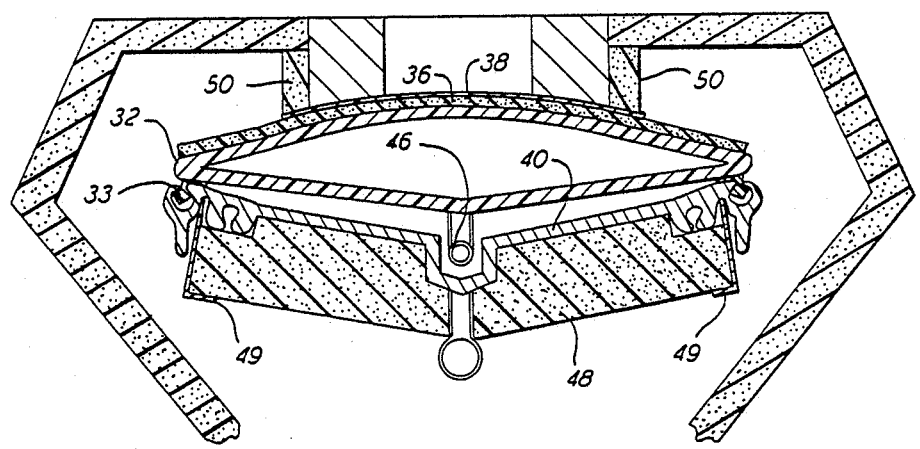
FIG. 2 is a sectional view of the bellows and cutoff plates.

Referring now to FIG. 2, it will be noted that bellows assembly 30 is in a convex configuration and that the terminal 10 is closed so that the only time the bellows assembly is not distorted is in an intermediate position in which the terminal is partly open. As best shown in FIGS. 3 and 4, bellows assembly 30 is made up of polyurethane bellows 32 which has two identical polyurethane extrusions 33 and 34 heat sealed thereto to form an integral unit. The extrusions 33 and 34 are uniformly spaced over the full length of the bellows 32 and, in cross section, are of an arrowhead or mushroom shape with flexible flared edges or barbs 33a and b and 34a and b. Bellows 32 is covered by polyurethane foam member 36 which is adhesively secured to bellows 32 in the center portion by adhesive. Foam member 36 is covered by impervious polyurethane film 38 which is adhesively attached thereto and of a width equal to the distance between the outer edges of cutoff plates 24 and 25.

Barbs 33a and b and 34a and b of extrusions 33 and 34, respectively, are received in recesses 42 and 43 in retainer 40. Retainer 40 is formed as an aluminum extrusion so that the dimensions, particularly the spacing between recesses 42 and 43, are held to close tolerances and the retainer structure is rigid. Similarly, the spacing of extrusions 33 and 34 is held to close tolerances when sealed to bellows 32. As a result, the profile of bellows 32 with respect to cutoff plates 24 and 25 is uniform over its entire length since the spacing of the fixed points of the bellows is uniform.

Retainer 40 defines a generally V-shaped recess 41 and therefore is able to receive the bellows assembly 30 when the terminal 10 is open, as illustrated in FIG. 1, and the bellows assembly 30 assumes a concave configuration with respect to the air flow. Recess 41 also receives bellows fitting 46 which is connected to the bleed thermostat and permits the inflation and deflation of bellows 32 under the control of the bleed thermostat. If necessary or desired, foam or another sound absorbing material 48 may be adhesively or otherwise suitably secured to the back of retainer 40 to reduce the sound level. Foam or another suitable sound absorbing material 50 is adhesively or otherwise suitably secured to cutoff plates 24 and 25. The foam 50 is located at the downstream edges of cutoff plates 24 and 25 so as to form a continuous surface therewith.

In assembling the bellows assembly 30, extrusions 33 and 34 are forced into recesses 42 and 43, respectively, by causing the flexing or collapsing of flared edges or barbs 33a and b and 34a and b which snap back into shape upon entering recesses 42 and 43, as best shown in FIG. 3. In operation, the position of the bellows assembly 30 will be dictated by the inflation of bellows 32 which is controlled by the bleed thermostat. Depending upon the position of the bleed thermostat, the bellows 32 may be at plenum pressure and the terminal closed, at atmospheric pressure and the terminal open or at some intermediate pressure with a corresponding degree of opening. In the closed position illustrated in FIG. 2, the bellows assembly 30 is at plenum pressure and is of a convex shape with the film 38 being in direct physical contact with cutoff plates 24 and 25 and extending to the outer edges of cutoff plates 24 and 25. Downstream of the edges of the cutoff plates 24 and 25, foam member 36 either engages or is in close proximity with foam 50. In the fully open position illustrated in FIG. 1, the bellows assembly is at atmospheric pressure and of a concave shape.

In operation, the bellows assembly 30 can assume the convex, closed position of FIG. 2, the concave fully open position of FIG. 1 or some intermediate position. The position of the bellows assembly 30 is controlled by a bleed valve (not illustrated) in response to the pressures sensed at high pressure pickup 18 and low pressure pickup 19 together with the zone temperature and setpoint. The bleed valve controls the supplying of pressurized air to bellows 32 and its exhausting to atmosphere. When terminal 10 is opened by moving bellows assembly 30 away from cutoff plates 24 and 25 and foam 50, a flow path is established. Air will then flow from high pressure area 15 through nozzle plate 14 into low pressure area 16 and then into slot 22. Air passing through slot 22 impinges upon film 38 and is diverted into two flows in essentially opposite directions. However, the profile of the bellows assembly 30 will influence the direction of the air flow. The two flows will pass between film 38 and cutoff plates 24 and 25, respectively. At a point corresponding to the downstream edges of cutoff plates 24 and 25 and the corresponding edges of film 38, the flow is between foam member 36 and foam 50 which has a sound reducing effect without interfering with the shutting off of the air flow. Foam 48 has an additional sound reducing effect. Metal members 49 cover the edges of foam 48 to reduce the sound level and for its aerodynamic effects. The two air flows are again diverted and pass through diffuser 90 into the room or zone.

Although a preferred embodiment of the present invention has been illustrated and described, other changes will occur to those skilled in the art. It is therefore intended that the scope of the present invention is to be limited only by the scope of the appended claims.

What is claimed is:

1. An air terminal means comprising:
   an elongated slot means which is fluidly connected to a plenum and which defines an outlet having cutoff plates extending laterally from both sides of said elongated slot to define a seating surface having a predetermined width;
   discharge means for discharging air flowing through said slot into a zone;
   bellows retainer means located transversely to said slot and intermediate said slot and said discharge means and having a pair of uniformly spaced first attachment means;
   a bellows assembly comprising:
   (a) an elongated rectangular bellows having a top wall and a bottom wall together defining an inflatable chamber therebetween and a pair of uniformly spaced resiliently deformable second attachment means located along both of the longer edges of said bellows and adapted to coact with said first attachment means to fixedly secure the longer edges of said bellows to said bellows retainer means,
   (b) fluid connection means connected to said bellows for supplying air to and exhausting air from said inflatable chamber so as to cause said top wall of said bellows between said fixedly secured longer edges to be of a configuration which varies between concave and convex,
   (c) porous foam secured to said top wall and overlying most of said top wall,
   (d) an impervious film secured to said porous foam and overlying an portion of said porous foam coextensive with said cutoff plates;
   whereby when said inflatable chamber is sufficiently inflated, said top wall between said fixedly secured longer edges, said porous foam and said impervious film are moved together into a convex shape with said film engaging said cutoff plates in a valving action to prevent flow through said slot and when said inflatable chamber is insufficiently inflated to hold said film in engagement with said cutoff plates, air flowing through said slot is divided into two flow paths defined by said film and respective ones of said cutoff plates before discharging through said discharge means.

2. The air terminal means of claim 1 wherein said bellows, foam and film are made of polyurethane.

3. The air terminal means of claim 1 wherein porous means are located on the outer portions of said cutoff plates and coact with corresponding portions of said porous foam to define continuations of said two flow paths defined by said film and respective ones of said cutoff plates.

4. The air terminal means of claim 3 further including porous means on said bellows retainer means.

* * * * *

UNITED STATES PATENT AND TRADEMARK OFFICE

Certificate

Patent No. 4,811,575                                                               Patented: March 14, 1989

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Frederick A. Currier, Carl C. Herb and Stephen C. Inglis.

Signed and Sealed This 19th Day of December, 1989

ROBERT E. GARRETT

*Supervisory Patent Examiner*
*Art Unit 341*